United States Patent
Kono et al.

(10) Patent No.: US 12,249,906 B2
(45) Date of Patent: Mar. 11, 2025

(54) AIR CONDITIONER

(71) Applicant: DAIKIN INDUSTRIES, LTD., Osaka (JP)

(72) Inventors: Masaki Kono, Osaka (JP); Keisuke Ohta, Osaka (JP); Reiji Kawashima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 553 days.

(21) Appl. No.: 17/561,185

(22) Filed: Dec. 23, 2021

(65) Prior Publication Data
US 2022/0113058 A1 Apr. 14, 2022

Related U.S. Application Data

(63) Continuation of application No. PCT/JP2020/023301, filed on Jun. 12, 2020.

(30) Foreign Application Priority Data

Jun. 24, 2019 (JP) .................................. 2019-116480

(51) Int. Cl.
*H02M 1/12* (2006.01)
*F24F 11/88* (2018.01)
(Continued)

(52) U.S. Cl.
CPC ............... *H02M 1/12* (2013.01); *F24F 11/88* (2018.01); *G05F 1/70* (2013.01); *H02M 1/4208* (2013.01);
(Continued)

(58) Field of Classification Search
CPC ........ H02M 1/12; H02M 1/4208; F24F 11/88; F24F 2140/50
See application file for complete search history.

(56) References Cited

U.S. PATENT DOCUMENTS

| | | | | |
|---|---|---|---|---|
| 5,793,623 A | * | 8/1998 | Kawashima | ............ H02P 27/08 |
| | | | | 363/56.05 |
| 2019/0097563 A1 | * | 3/2019 | Shimomugi | ............ F25B 31/02 |

(Continued)

FOREIGN PATENT DOCUMENTS

| | | |
|---|---|---|
| AU | 2017372665 A1 | 6/2018 |
| JP | 2012-225537 A | 11/2012 |

(Continued)

OTHER PUBLICATIONS

International Preliminary Report of corresponding PCT Application No. PCT/JP2020/023301 dated Jan. 6, 2022.
(Continued)

*Primary Examiner* — Jue Zhang
(74) *Attorney, Agent, or Firm* — GLOBAL IP COUNSELORS, LLP

(57) ABSTRACT

An air conditioner is connected to an AC power source. The air conditioner includes an adjustment unit and a control unit. The adjustment unit adjusts apparent power at a power source input terminal of the air conditioner. The control unit controls the adjustment unit, based on information according to a target value of apparent power to be supplied to the AC power source from the air conditioner.

17 Claims, 8 Drawing Sheets

(51) Int. Cl.
    *G05F 1/70*     (2006.01)
    *H02M 1/42*     (2007.01)
    *F24F 140/50*     (2018.01)
    *H02M 7/04*     (2006.01)
    *H02P 27/06*     (2006.01)

(52) U.S. Cl.
    CPC ........... *F24F 2140/50* (2018.01); *H02M 7/04* (2013.01); *H02P 27/06* (2013.01)

(56) References Cited

U.S. PATENT DOCUMENTS

2019/0238046 A1     8/2019   Kawashima et al.
2019/0252881 A1*   8/2019   Kono ..................... H02M 1/12

FOREIGN PATENT DOCUMENTS

JP           6299831 B1     3/2018
JP         2018-61351 A     4/2018
WO    WO-2018105737 A1 *   6/2018  ............. F24F 11/88

OTHER PUBLICATIONS

European Search Report of corresponding EP Application No. 20 83 3070.4 dated Jan. 18, 2023.
International Search Report of corresponding PCT Application No. PCT/JP2020/023301 dated Aug. 25, 2020.

* cited by examiner

AIR CONDITIONER

CROSS-REFERENCE TO RELATED APPLICATIONS

This is a continuation of International Application No. PCT/JP2020/023301 filed on Jun. 12, 2020, which claims priority to Japanese Patent Application No. 2019-116480, filed on Jun. 24, 2019. The entire disclosures of these applications are incorporated by reference herein.

BACKGROUND

Field of Invention

The present disclosure relates to an air conditioner.

Background Information

Japanese Patent No. 6299831 discloses an active filter device connected to a power conversion device to be supplied with power via a distribution board. This active filter device includes a current source, a first detection unit, a second detection unit, and a controller. The current source has an output connected to a power receiving path of the power conversion device and generates a current of a first compensation portion for performing at least one of reduction of a harmonic current and improvement of a fundamental power factor in the power conversion device. The first detection unit detects a current flowing in the power receiving path of the power conversion device. The second detection unit detects a current flowing in a power receiving path of the distribution board. Based on a detected value detected by the first detection unit, the controller calculates the current of the first compensation portion. Based on a detected value detected by the second detection unit, the controller calculates a second compensation portion for performing at least one of reduction of a harmonic current and improvement of a fundamental power factor in the power receiving path of the distribution board. The controller allows the current source to generate a current obtained through superimposition of a current of the second compensation portion and the current of the first compensation portion.

SUMMARY

A first aspect of the present disclosure relates to an air conditioner connected to an AC power source. The air conditioner includes an adjustment unit and a control unit. The adjustment unit is configured to adjust apparent power at a power source input terminal of the air conditioner. The control unit is configured to control the adjustment unit, based on information according to a target value of apparent power to be supplied to the AC power source from the air conditioner.

DETAILED DESCRIPTION OF EMBODIMENT(S)

Figure 1:
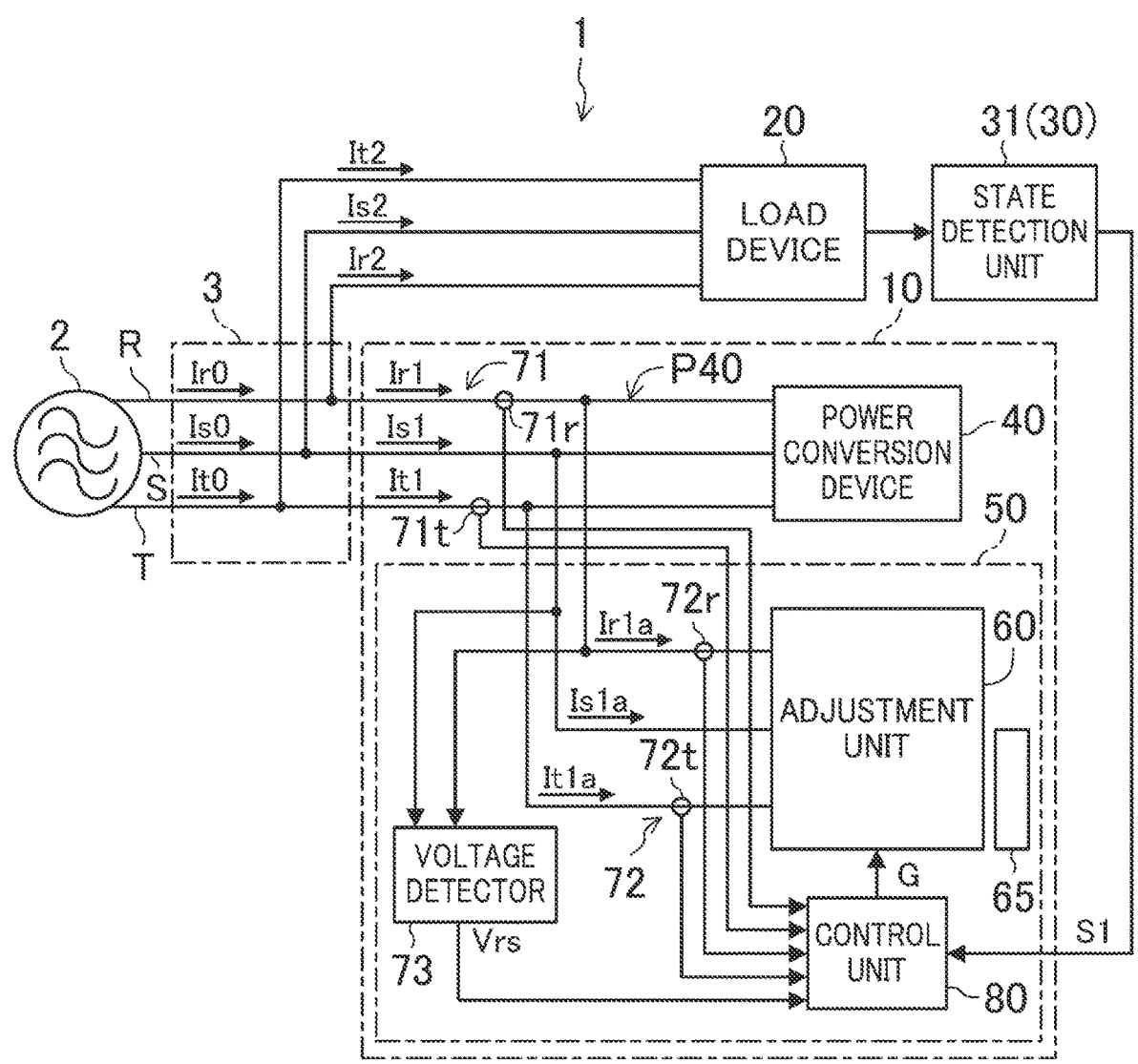
FIG. 1 is a block diagram illustrating a configuration of a system according to a first embodiment.

Embodiments will be described in detail below with reference to the drawings. Note that the same or equivalent portions are denoted by the same reference sign in the drawings, so that description thereof is not to be repeated.

First Embodiment

FIG. 1 illustrates a configuration of a system (1) according to a first embodiment. This system (1) is a system that receives power supplied from an AC power source (2). In this example, the AC power source (2) is a three-phase AC power source and has an R-phase, an S-phase, and a T-phase. In addition, the system (1) includes an air conditioner (10), a distribution board (3), a load device (20), and a state detection unit (31). For example, this system (1) is provided in a structure (not illustrated) such as a factory, a building, an apartment, or a detached house.

Distribution Board

The distribution board (3) is connected to the AC power source (2) and a plurality of devices (in this example, the air conditioner (10) and the load device (20)) of the system (1). The distribution board (3) receives power supplied from the AC power source (2) and supplies the power to the plurality of devices of the system (1). Specifically, the distribution board (3) is equipped with a plurality of breakers (not illustrated). The power from the AC power source (2) is supplied to the plurality of devices connected to the distribution board (3) through the plurality of breakers. In this example, among the plurality of breakers of the distribution board (3), one breaker is connected to the air conditioner (10) and another breaker is connected to the load device (20).

Load Device

The load device (20) is a device connected to the AC power source (2) along with the air conditioner (10). In this example, the load device (20) is electrically connected to the AC power source (2) through the distribution board (3) and receives the power supplied from the AC power source (2) through the distribution board (3) to operate. Note that examples of the load device (20) include an elevator, an escalator, a fan, a pump, a ventilation device, lighting equipment driven with three-phase AC power, and another air conditioner (for example, an air conditioner not including an adjustment device (50) described later) different from the air conditioner (10), which are provided in the building.

State Detection Unit (Input Unit)

The state detection unit (31) detects an operating state of the load device (20) (a device connected to the AC power source (2) along with the air conditioner (10)). A detection result obtained by the state detection unit (31) is sent to a control unit (80) described later. The state detection unit (31) is an example of an input unit (30) to which information on the operating state of the load device (20) is input. Note that the information on the operating state of the load device (20) is an example of information according to a target value (hereinafter, referred to as "target apparent power") of apparent power to be supplied to the AC power source (2) from the air conditioner (10). These pieces of information will be described in detail later.

In this example, the state detection unit (31) detects the operating state of the load device (20) and outputs a detection signal (S1) indicating the detection result. In addition, the state detection unit (31) is disposed outside the air conditioner (10).

Air Conditioner

The air conditioner (10) performs air conditioning in an air-conditioning target space (for example, an indoor space) in the building. The air conditioner (10) is connected to the AC power source (2). In this example, the air conditioner (10) is electrically connected to the AC power source (2) through the distribution board (3) and receives the power supplied from the AC power source (2) through the distribution board (3) to operate. Specifically, the air conditioner (10) includes a refrigerant circuit (not illustrated), a power conversion device (40), and the adjustment device (50).

Refrigerant Circuit

The refrigerant circuit includes a compressor that compresses refrigerant, a heat exchanger that allows the refrigerant and air to exchange heat, and so on. The refrigerant circuit performs a refrigeration cycle by causing the refrigerant to circulate therethrough. The compressor is equipped with an electric motor that drives a compression mechanism. In response to the electric motor being supplied with power, the electric motor is driven. In response to the electric motor being driven, the compressor is driven and consequently the refrigerant circuit performs the refrigeration cycle. In this manner, air conditioning is performed.

Power Conversion Device

The power conversion device (40) is connected to the AC power source (2). In this example, the power conversion device (40) is connected to the distribution board (3) by a power receiving path (P40). For example, the power receiving path (P40) is constituted by a power cable. With such a configuration, the power conversion device (40) is electrically connected to the AC power source (2) through the power receiving path (P40) and the distribution board (3) and receives the power supplied from the AC power source (2) through the distribution board (3) and the power receiving path (P40) to operate. Specifically, the power conversion device (40) converts the power supplied from the AC power source (2) into output power having a desired voltage and a desired frequency, and supplies the output power to the electric motor of the compressor of the refrigerant circuit. For example, the power conversion device (40) includes a converter that converts AC power into DC power, an inverter that converts DC power into AC power through a switching operation, and so on.

Adjustment Device

The adjustment device (50) adjusts apparent power at a power source input terminal of the air conditioner (10). Consequently, the apparent power to be supplied to the AC power source (2) from the air conditioner (10) is adjusted, and a power factor (hereinafter, referred to as a "power source power factor") of the AC power source (2) is adjusted. In this example, the adjustment device (50) is incorporated into the air conditioner (10). The adjustment device (50) is in a driven state when the air conditioner (10) is in a driven state. The adjustment device (50) is in a stopped state when the air conditioner (10) is in a stopped state. In addition, in this example, the adjustment device (50) includes an adjustment unit (60), a cooler (65), a first current detector (71), a second current detector (72), a voltage detector (73), and the control unit (80).

Adjustment Unit

The adjustment unit (60) adjusts apparent power at the power source input terminal of the air conditioner (10). In this example, the adjustment unit (60) is connected to a midway portion of the power receiving path (P40), which is an example of the power source input terminal of the air conditioner (10), and adjusts apparent power in the power receiving path (P40).

Figure 2:
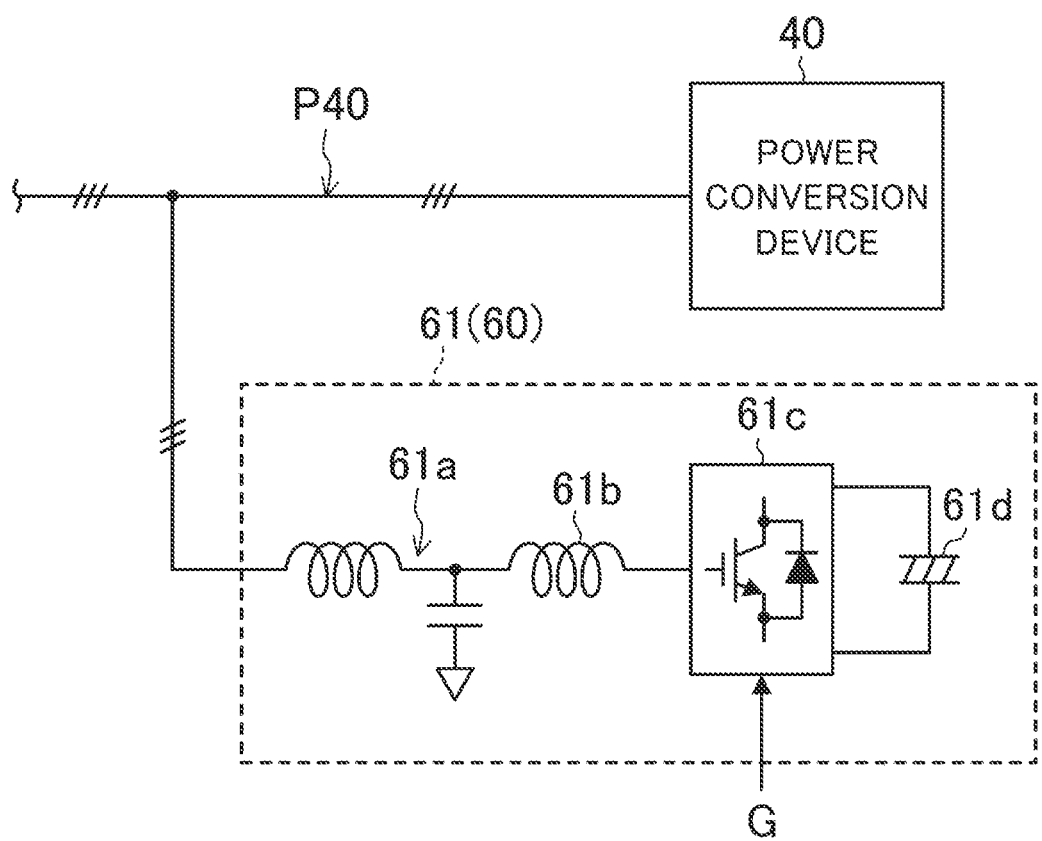
FIG. 2 is a diagram illustrating a configuration of an active filter.

In this example, the adjustment unit (60) is an active filter (61) illustrated in FIG. 2. The active filter (61) is connected to the AC power source (2). Specifically, the active filter (61) is connected to the power receiving path (P40) and thus is electrically connected to the AC power source (2) through the power receiving path (P40) and the distribution board (3).

Note that in this example, the active filter (61) improves the power source power factor. Specifically, the active filter (61) improves the power source power factor by supplying the power receiving path (P40) with a compensation current that can compensate for a reactive component of the AC power source (2).

In addition, in this example, the active filter (61) reduces a harmonic current included in currents (Ir0, Is0, It0) of the AC power source (2) in addition to improving the power source power factor. Specifically, the active filter (61) supplies the power receiving path (P40) with the compensation current that is a current having a phase opposite to that of the harmonic current included in the currents (Ir0, Is0, It0) of the AC power source (2) such that the reactive component of the AC power source (2) can be compensated for and that waveforms of the currents (Ir0, Is0, It0) of the AC power source (2) approach a sinusoidal wave.

As illustrated in FIG. 2, the active filter (61) includes a low-pass filter (61a), a reactor (61b), a switching element (61c), and an electrolytic capacitor (61d). The switching element (61c) is controlled by the control unit (80).

Cooler

The cooler (65) cools the active filter (61). The cooler (65) is switched between a driven state in which the active filter (61) is cooled and a stopped state in which the active filter (61) is not cooled. An operation of the cooler (65) is controlled by the control unit (80). In this example, the cooler (65) is in the driven state while the air conditioner (10) is driven. The cooler (65) is in the stopped state while the air conditioner (10) is stopped. For example, the cooler (65) is a fan that can be switched to be driven and stopped by the control unit (80). This fan may be a dedicated fan exclusively used for cooling the active filter (61) or may be a transport fan that transports air to another constituent component (for example, the heat exchanger of the refrigerant circuit) other than the active filter (61). For example, the active filter (61) may be disposed in an air transport path generated by the transport fan.

First Current Detector

The first current detector (71) detects currents (Ir1, Is1, It1) input to the air conditioner (10). In this example, the first current detector (71) includes a first current sensor (71r) and a second current sensor (71t). The first current sensor (71r) and the second current sensor (71t) respectively detect an R-phase current (Ir1) and a T-phase current (It1) among the three-phase currents (Ir1, Is1, It1) input to the air conditioner (10). A detection result obtained by the first current detector (71) is sent to the control unit (80). For example, the first current detector (71) may be a current transformer.

Second Current Detector

The second current detector (72) detects currents (Ir1a, Is1a, It1a) input to the adjustment device (50). In this example, the second current detector (72) includes a third current sensor (72r) and a fourth current sensor (72t). The third current sensor (72r) and the fourth current sensor (72t) respectively detect an R-phase current (Ir1a) and a T-phase current (It1a) among the three-phase currents (Ir1a, Is1a, It1a) input to the adjustment device (50). A detection result obtained by the second current detector (72) is sent to the control unit (80). For example, the second current detector (72) may be a current transformer.

Voltage Detector

The voltage detector (73) detects a power source voltage (Vrs) which is a voltage of the AC power source (2). A detection result obtained by the voltage detector (73) is sent to the control unit (80).

Control Unit

The control unit (80) controls the adjustment unit (60), based on information according to target apparent power. Specifically, the control unit (80) controls the adjustment unit (60) such that the power source power factor becomes equal to a predetermined target power factor (for example, 1). For example, the control unit (80) is constituted by a processor and a memory that stores a program and data for causing the processor to operate.
Relationship between Operating State of Load Device and Power Source Power Factor A relationship between the operating state of the load device (20) and the power source power factor will now be described. For each operating state of the load device (20), waveforms of currents (Ir2, Is2, It2) input to the load device (20) in that operating state are determined as a rule. Thus, the waveforms of the currents (Ir2, Is2, It2) to be input to the load device (20) can be estimated from the operating state of the load device (20). In addition, an amount of change in power source power factor resulting from the operation of the load device (20) can be estimated from the waveforms of the currents (Ir2, Is2, It2) to be input to the load device (20).

The sums of the currents (Ir1, Is1, It1) input to the air conditioner (10) and the respective currents (Ir2, Is2, It2) input to the load device (20) are equivalent to currents (Ir0, Is0, It0) supplied from the AC power source (2). The sum of the amount of change in power source power factor resulting from the operation of the air conditioner (10) and the amount of change in power source power factor resulting from the operation of the load device (20) is equivalent to an amount of change in power factor of the AC power source (2).

Details of Control Unit

In this example, the control unit (80) determines the target apparent power in accordance with the amount of change in power source power factor resulting from the operation of the load device (20) such that the power source power factor becomes equal to the target power factor. For example, in the case where the target power factor is equal to "1" and the amount of change in power source power factor resulting from the operation of the load device (20) is equal to "−0.3 (lagging power factor)", the target apparent power is determined such that the amount of change in power source power factor resulting from the operation of the air conditioner (10) becomes equal to "+0.3 (leading power factor)". The control unit (80) then controls the adjustment unit (60) such that the apparent power to be supplied to the AC power source (2) from the air conditioner (10) becomes equal to the target apparent power. By controlling the apparent power to be supplied to the AC power source (2) from the air conditioner (10) in this manner, the amount of change in power source power factor resulting from the operation of the air conditioner (10) can be controlled and thus the power source power factor can be caused to approach the target power factor.

Specifically, in this example, the control unit (80) estimates the currents (Ir2, Is2, It2) to be input to the load device (20), based on the operating state of the load device (20). In accordance with the estimated values of the currents (Ir2, Is2, It2) to be input to the load device (20), the control unit (80) determines target values (hereinafter, referred to as "target compensation currents") of the currents (Ir1a, Is1a, It1a) to be input to the adjustment device (50) such that the power source power factor becomes equal to the target power factor. Note that the target compensation currents are an example of the target apparent power. The control unit (80) then controls the adjustment unit (60) such that the currents (Ir1a, Is1a, It1a) to be input to the adjustment device (50) become equal to the target compensation currents. By controlling the currents (Ir1a, Is1a, It1a) to be input to the adjustment device (50) in this manner, apparent power to be supplied to the AC power source (2) from the air conditioner (10) can be controlled.

Note that in this example, the control unit (80) controls the adjustment unit (60), based on the detection result obtained by the state detection unit (31). The state detection unit (31) is an example of the input unit (30) to which the information on the operating state of the load device (20) is input. The information on the operating state of the load device (20) is information for use in obtaining the target apparent power and thus is an example of information according to target apparent power. The control unit (80) controls the adjustment unit (60), based on the information (the information on the operating state of the load device (20)) input to the input unit (30).

In addition, in this example, the control unit (80) is in a driven state when the air conditioner (10) is in the driven state. The control unit (80) is in a stopped state when the air conditioner (10) is in the stopped state.

Configuration of Control Unit

Figure 3:
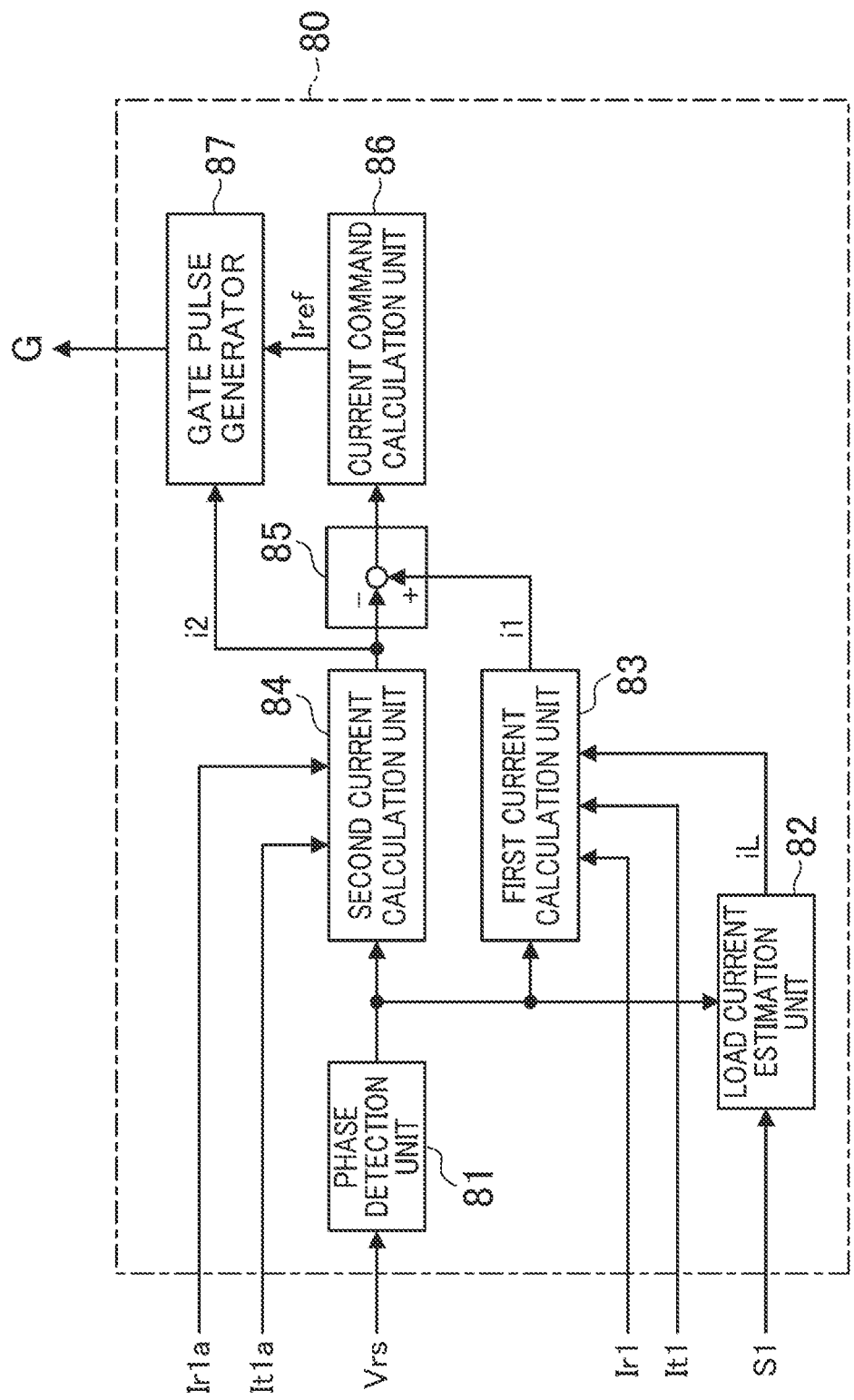
FIG. 3 is a block diagram illustrating a configuration of a control unit.

As illustrated in FIG. 3, the control unit (80) includes a phase detection unit (81), a load current estimation unit (82), a first current calculation unit (83), a second current calculation unit (84), a subtraction unit (85), a current command calculation unit (86), and a gate pulse generator (87).

The phase detection unit (81) receives an input of the power source voltage (Vrs) detected by the voltage detector (73) and detects a phase of the power source voltage (Vrs).

The load current estimation unit (82) estimates the currents (Ir2, Is2, It2) to be input to the load device (20), based on the detection result obtained by the state detection unit (31) and the phase of the power source voltage (Vrs) detected by the phase detection unit (81), and outputs the estimated currents as a load current (iL). Specifically, the load current estimation unit (82) has table data in which the operating state of the load device (20) is associated with waveforms of the currents (Ir2, Is2, It2) input to the load device (20). The load current estimation unit (82) detects, from the table data, waveforms of the currents (Ir2, Is2, It2) input to the load device (20) and corresponding to the operating state of the load device (20) indicated by the detection signal (S1) output from the state detection unit (31). From among a plurality of current values that form the detected waveforms of the currents (Ir2, Is2, It2) input to the load device (20), the load current estimation unit (82) detects a current value corresponding to the phase of the power source voltage (Vrs) detected by the phase detection unit (81). The load current estimation unit (82) outputs the detected current value as the load current (iL).

The first current calculation unit (83) generates a first current command value (i1), based on the currents (Ir1, Is1, It1) (in this example, the currents (Ir1, It1)) input to the air conditioner (10) and detected by the first current detector (71), the phase of the power source voltage (Vrs) detected by the phase detection unit (81), and the currents (Ir1a, Is1a, It1a) input to the load device (20) and estimated by the load current estimation unit (82). The first current command value (i1) is a value according to a change in power source power factor resulting from the operations of the air conditioner (10) and the load device (20). In this example, the first current calculation unit (83) combines the output of the first current detector (71) and the output of the load current estimation unit (82), extracts a fundamental wave and a harmonic current component from a composite current obtained through the combination, and outputs the extracted components as the first current command value (i1).

The second current calculation unit (84) generates a second current command value (i2), based on the currents (Ir1a, Is1a, It1a) (in this example, the currents (Ir1a, It1a)) input to the adjustment device (50) and detected by the second current detector (72) and the phase of the power source voltage (Vrs) detected by the phase detection unit (81). The second current command value (i2) is a value according to the change in power source power factor resulting from the operation of the adjustment device (50). In this example, the second current calculation unit (84) extracts a fundamental wave and a harmonic component from the output of the second current detector (72), and outputs the extracted components as the second current command value (i2).

The subtraction unit (85) substrates the second current command value (i2) generated by the second current calculation unit (84) from the first current command value (i1) generated by the first current calculation unit (83). The current command calculation unit (86) generates a target command value (Iref), based on the output of the subtraction unit (85) (the command value obtained by subtracting the second current command value (i2) from the first current command value (i1)). The target command value (Iref) is equivalent to the target compensation currents (the target values of the currents (Ir1a, Is1a, It1a) to be input to the adjustment device (50)). Specifically, the current command calculation unit (86) generates the target command value (Iref) indicating a current having a phase opposite to that of the output of the subtraction unit (85).

The gate pulse generator (87) generates a switching command value (G), based on the target command value (Iref) generated by the current command calculation unit (86) and the second current command value (i2) generated by the second current calculation unit (84). The switching command value (G) is a command value for controlling the operation of the adjustment unit (60). Specifically, the gate pulse generator (87) generates the switching command value (G) in accordance with a deviation between the second current command value (i2) and the target command value (Iref) such that the second current command value (i2) becomes equal to the target command value (Iref).

Description of Comparative Example

A device of PTL 1 (Japanese Patent No. 6299831) which is a comparative example of the present disclosure will be described next. In the device of PTL 1, a second detection unit is disposed between an AC power source and a distribution board and a controller is disposed inside an air conditioner. Thus, a distance from the second detection unit to the controller is long. For this reason, wiring between the second detection unit and the controller needs to be long. This makes it difficult to reduce the cost (for example, installation cost) for wiring between the second detection unit and the controller. In addition, a current capacitance of the second detection unit needs to be large. This makes it difficult to reduce the cost for manufacturing the second detection unit. Therefore, it is difficult to reduce the initial cost including the cost for wiring between the second detection unit and the controller, the cost for manufacturing the second detection unit, etc.

Feature (1) of First Embodiment

As described above, the air conditioner (10) according to the first embodiment is an air conditioner (10) that is connected to an AC power source (2) and that includes an adjustment unit (60) configured to adjust apparent power at a power source input terminal of the air conditioner (10), and a control unit (80) configured to control the adjustment unit (60), based on information according to a target value of apparent power to be supplied to the AC power source (2) from the air conditioner (10).

In the first embodiment, a current sensor need not be provided on a power source side of the distribution board (3). Thus, the cost (for example, the initial cost) such as the cost for wiring and the cost for manufacturing the current sensor can be reduced compared with the case where such a current sensor is provided.

Feature (2) of First Embodiment

In the air conditioner (10) according to the first embodiment, the information according to the target value of the apparent power to be supplied to the AC power source (2) from the air conditioner (10) is information on an operating state of a device (20) connected to the AC power source (2) along with the air conditioner (10). The information on the operating state of the device (20) connected to the AC power source (2) along with the air conditioner (10) is input to an input unit (30). The control unit (80) controls the adjustment unit (60), based on the information input to the input unit (30).

In the first embodiment, by controlling the adjustment unit (60) based on the information on the operating state of the device (20) connected to the AC power source (2) along with the air conditioner (10), the apparent power to be supplied to the AC power source (2) from the air conditioner (10) can be controlled such that a power factor of the AC power source (2) approaches a target power factor (for example, 1).

Feature (3) of First Embodiment

In the air conditioner (10) according to the first embodiment, the input unit (30) includes a state detection unit (31) configured to detect the operating state of the device (20) connected to the AC power source (2) along with the air conditioner (10). The control unit (80) controls the adjustment unit (60), based on a detection result obtained by the state detection unit (31).

In the first embodiment, by controlling the adjustment unit (60) based on the detection result obtained by the state detection unit (31), the apparent power to be supplied to the AC power source (2) from the air conditioner (10) can be controlled such that the power factor of the AC power source (2) approaches the target power factor (for example, 1).

Second Embodiment

Figure 4:
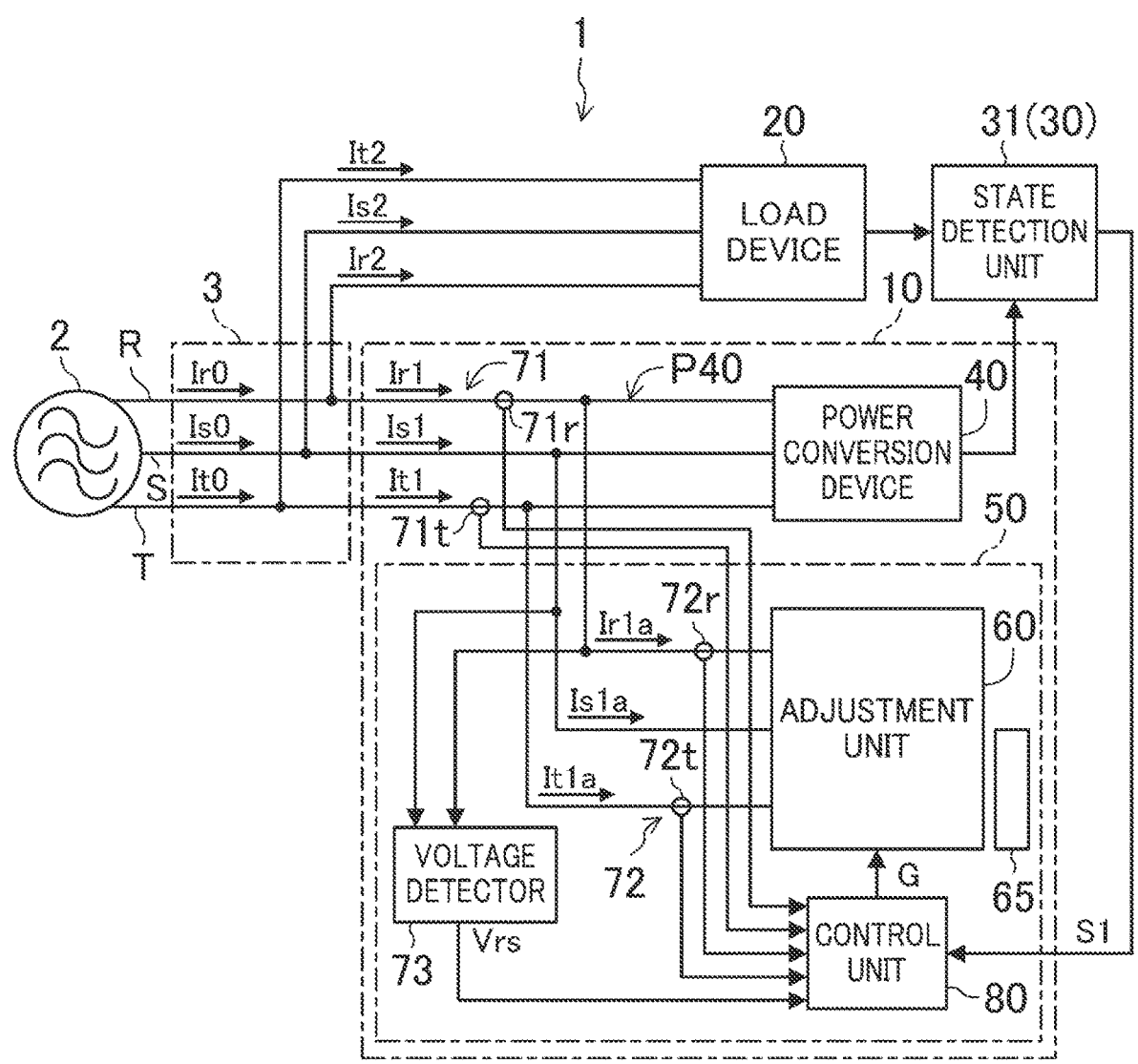
FIG. 4 is a block diagram illustrating a configuration of a system according to a second embodiment.

FIG. 4 illustrates a configuration of a system (1) according to a second embodiment. This system (1) according to the second embodiment is different from the system (1) according to the first embodiment in operations of a state detection unit (31) and a control unit (80). The other configurations of the system (1) according to the second embodiment are substantially the same as the configurations of the system (1) according to the first embodiment.

State Detection Unit

In the second embodiment, the state detection unit (31) detects an operating state of a load device (20) and an operating state of an air conditioner (10). That is, the state detection unit (31) according to the second embodiment is an example of an input unit (30) to which information on the operating state of the load device (20) and information on the operating state of the air conditioner (10) are input. For example, the state detection unit (31) is a central monitoring device provided in a central monitoring room of a building. This central monitoring device manages operating states of a plurality of devices provided in the building.

In this example, the state detection unit (31) detects the operating state of the load device (20) and the operating state of the air conditioner (10), and outputs a detection signal (S1) indicating the detection results. In addition, the state detection unit (31) is disposed outside the air conditioner (10).

Control Unit

As in the first embodiment, in the second embodiment, the control unit (80) controls an adjustment unit (60), based on information according to target apparent power (a target value of apparent power to be supplied to an AC power source (2) from the air conditioner (10)). Specifically, the control unit (80) controls the adjustment unit (60) such that a power source power factor (a power factor of the AC power source (2)) becomes equal to a target power factor (for example, 1).

In addition, in the second embodiment, the control unit (80) is configured to operate not only when the air conditioner (10) is in the driven state but also when the air conditioner (10) is in the stopped state. In this example, the control unit (80) controls the adjustment unit (60), based on the information according to the target apparent power even while the air conditioner (10) is stopped. Specifically, the control unit (80) controls the adjustment unit (60), based on the detection results obtained by the state detection unit (31) even while the air conditioner (10) is stopped.

In the second embodiment, when both the air conditioner (10) and the load device (20) are in the driven state, the control unit (80) determines the target apparent power in accordance with an amount of change in power source power factor resulting from the operations of the air conditioner (10) and the load device (20). When the air conditioner (10) is in the driven state and the load device (20) is in the stopped state, the control unit (80) determines the target apparent power in accordance with the amount of change in power source power factor resulting from the operation of the air conditioner (10). When the load device (20) is in the driven state and the air conditioner (10) is in the stopped state, the control unit (80) determines the target apparent power in accordance with the amount of change in power source power factor resulting from the operation of the load device (20).

Feature (1) of Second Embodiment

As described above, the air conditioner (10) according to the second embodiment can achieve substantially the same advantages as the air conditioner (10) according to the first embodiment. For example, a current sensor need not be provided on a power source side of the distribution board (3). Thus, the cost (for example, the initial cost) such as the cost for wiring and the cost for manufacturing the current sensor can be reduced compared with the case where such a current sensor is provided.

Feature (2) of Second Embodiment

In the air conditioner (10) according to the second embodiment, even while the air conditioner (10) is stopped, the control unit (80) controls the adjustment unit (60), based on the information according to the target value of the apparent power to be supplied to the AC power source (2) from the air conditioner (10).

In the second embodiment, the adjustment unit (60) can be controlled even while the air conditioner (10) is stopped. Thus, even while the air conditioner (10) is stopped, the apparent power to be supplied to the AC power source (2) from the air conditioner (10) can be controlled such that the power factor of the AC power source (2) approaches the target power factor (for example, 1).

Third Embodiment

Figure 5:
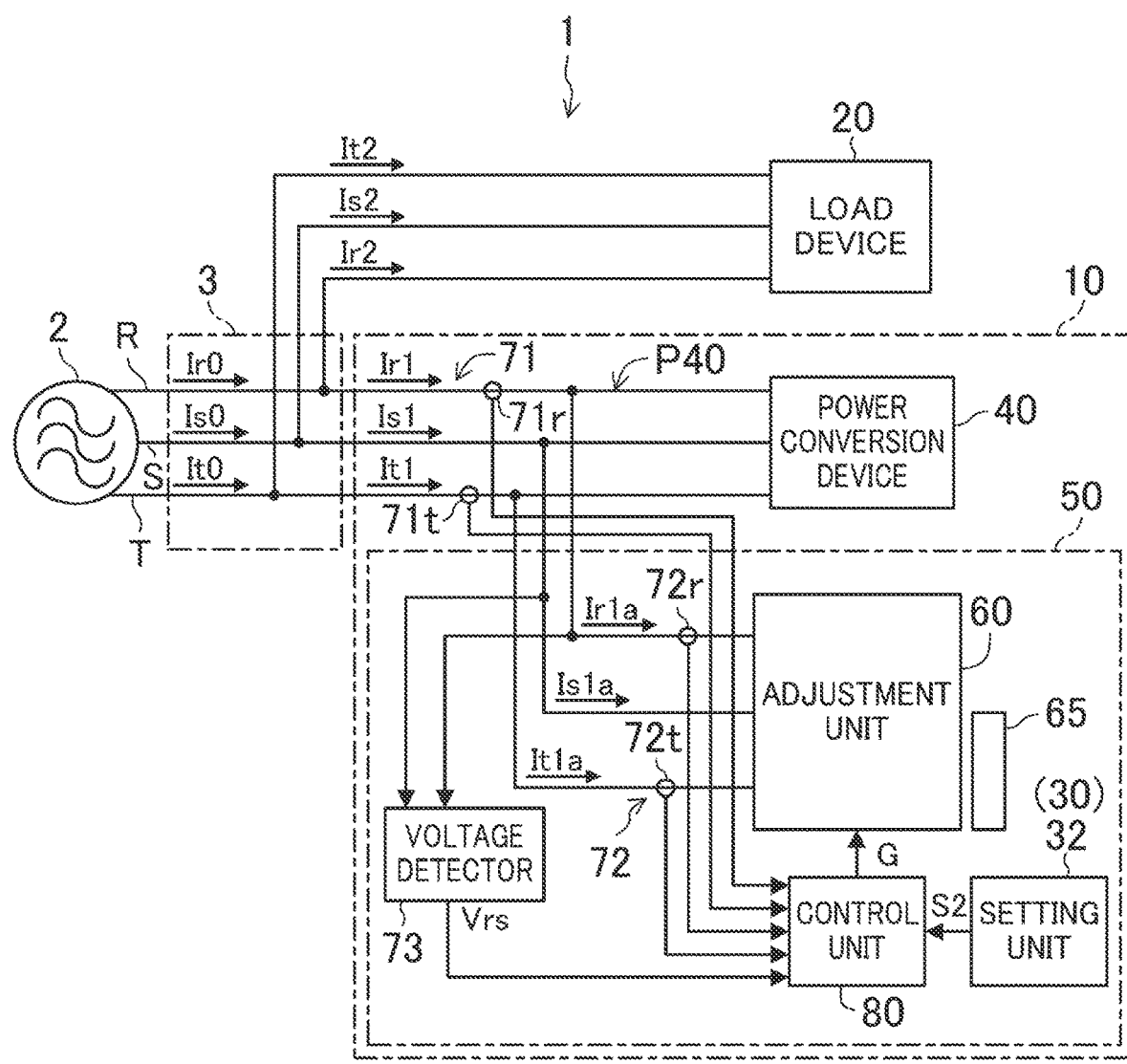
FIG. 5 is a block diagram illustrating a configuration of a system according to a third embodiment.

FIG. 5 illustrates a configuration of a system (1) according to a third embodiment. This system (1) according to the third embodiment includes a setting unit (32) in place of the state detection unit (31) illustrated in FIG. 1. In addition, the system (1) according to the third embodiment is different from the system (1) according to the first embodiment in an operation of a control unit (80). The other configurations of the system (1) according to the third embodiment are substantially the same as those of the system (1) according to the first embodiment.

Setting Unit

At least one of a type and presence or absence of a load device (20) is set in the setting unit (32). Specifically, the setting unit (32) includes a plurality of switches. At least one of the type and the presence or absence of the load device (20) is set by on/off of these plurality of switches. For example, different types of the load device (20) are associated with the plurality of switches of the setting unit (32). In response to one of the plurality of switches of the setting unit (32) being switched from an on state to an off state, it is set in the setting unit (32) that the load device (20) of the type assigned to that switch is provided in the system (1). On the other hand, in response to one of the plurality of switches of the setting unit (32) being switched from the off state to the on state, it is set in the setting unit (32) that the load device (20) of the type assigned to that switch is not provided in the system (1). For example, the setting unit (32) is a DIP switch (Dual In-line Package Switch).

In addition, in this example, at least one of the type and the presence or absence of the load device (20) is set in the setting unit (32), and the setting unit (32) outputs a setting signal (S2) indicating the setting in the setting unit (32). The setting unit (32) is provided in an adjustment device (50). That is, the setting unit (32) is incorporated into an air conditioner (10).

Control Unit

As in the first embodiment, in the third embodiment, the control unit (80) controls an adjustment unit (60), based on information according to target apparent power (a target value of apparent power to be supplied to an AC power source (2) from the air conditioner (10)). Specifically, the control unit (80) controls the adjustment unit (60) such that a power source power factor (a power factor of the AC power source (2)) becomes equal to a target power factor (for example, 1).

Relationship between Type and Presence or Absence of Load Device and Power Source Power Factor A relationship between the type and the presence or absence of the load device (20) and the power source power factor will now be described. For a particular load device (20) (for example, an elevator), a time period in which the load device (20) is driven and waveforms of currents (Ir2, Is2, It2) input to the load device while the load device (20) is driven are determined as a rule. Thus, the waveforms of the currents (Ir2, Is2, It2) to be input to the load device (20) can be estimated from at least one of the type and the presence or absence of the load device (20) of the system (1). In addition, an amount of change in power source power factor resulting from the operation of the load device (20) can be estimated from the waveforms of the currents (Ir2, Is2, It2) to be input to the load device (20). The sum of the amount of change in power source power factor resulting from the operation of the air conditioner (10) and the amount of change in power source power factor resulting from the operation of the load device (20) is equivalent to an amount of change in power factor of the AC power source (2).

Details of Control Unit

As in the first embodiment, in third embodiment, the control unit (80) determines the target apparent power in accordance with the amount of change in power source power factor resulting from the operation of the load device (20) such that the power source power factor becomes equal to the target power factor. The control unit (80) then controls the adjustment unit (60) such that the apparent power to be supplied to the AC power source (2) from the air conditioner (10) becomes equal to the target apparent power.

Specifically, in the third embodiment, the control unit (80) estimates the currents (Ir2, Is2, It2) to be input to the load device (20), based on at least one of the type and the presence or absence of the load device (20) in the system (1). In accordance with estimated values of the currents (Ir2, Is2, It2) to be input to the load device (20), the control unit (80) determines target compensation currents (target values of currents (Ir1a, Is1a, It1a) to be input to the adjustment device (50)) such that the power source power factor becomes equal to the target power factor. The control unit (80) then controls the adjustment unit (60) such that the currents (Ir1a, Is1a, It1a) to be input to the adjustment device (50) become equal to the target compensation currents.

Note that in the third embodiment, the control unit (80) controls the adjustment unit (60), based on the setting in the setting unit (32). The setting unit (32) is an example of an input unit (30) to which information on the operating state of the load device (20) is input. The information on the operating state of the load device (20) is an example of information according to target apparent power. The control unit (80) controls the adjustment unit (60), based on the information (the information on the operating state of the load device (20)) input to the input unit (30).

Specifically, in the third embodiment, the load current estimation unit (82) of the control unit (80) estimates the currents (Ir2, Is2, It2) to be input to the load device (20), based on the setting in the setting unit (32) and the phase of the power source voltage (Vrs) detected by the phase detection unit (81), and outputs the estimated currents as the load current (iL). Specifically, the load current estimation unit (82) has table data in which the setting (at least one of the type and the presence or absence of the load device (20)) in the setting unit (32) is associated with waveforms of the currents (Ir2, Is2, It2) input to the load device (20). The load current estimation unit (82) detects, from the table data, waveforms of the currents (Ir2, Is2, It2) input to the load device (20) and corresponding to the setting in the setting unit (32) indicated by the setting signal (S2) output from the setting unit (32). From among a plurality of current values that form the detected waveforms of the currents (Ir2, Is2, It2) input to the load device (20), the load current estimation unit (82) detects a current value corresponding to the phase of the power source voltage (Vrs) detected by the phase detection unit (81). The load current estimation unit (82) outputs the detected current value as the load current (iL).

In addition, in the third embodiment, the control unit (80) is configured to operate not only while the air conditioner (10) is driven but also while the air conditioner (10) is stopped. Specifically, the control unit (80) controls the adjustment unit (60), based on the setting in the setting unit (32) even while the air conditioner (10) is stopped.

Feature (1) of Third Embodiment

As described above, the air conditioner (10) according to the third embodiment can achieve substantially the same advantages as the air conditioner (10) according to the first embodiment. For example, a current sensor need not be provided on a power source side of the distribution board (3). Thus, the cost (for example, the initial cost) such as the cost for wiring and the cost for manufacturing the current sensor can be reduced compared with the case where such a current sensor is provided.

Feature (2) of Third Embodiment

In the air conditioner (10) according to the third embodiment, the information according to the target value of the apparent power to be supplied to the AC power source (2) from the air conditioner (10) is information on an operating state of a device (20) connected to the AC power source (2) along with the air conditioner (10). The information on the operating state of the device (20) connected to the AC power source (2) along with the air conditioner (10) is input to an input unit (30). The input unit (30) includes a setting unit (32) in which at least one of a type and presence or absence of the device (20) connected to the AC power source (2) along with the air conditioner (10) is set. The control unit (80) controls the adjustment unit (60), based on the setting in the setting unit (32).

In the third embodiment, by controlling the adjustment unit (60) based on the setting in the setting unit (32), the apparent power to be supplied to the AC power source (2) from the air conditioner (10) can be controlled such that the power factor of the AC power source (2) approaches the target power factor (for example, 1).

Fourth Embodiment

Figure 6:
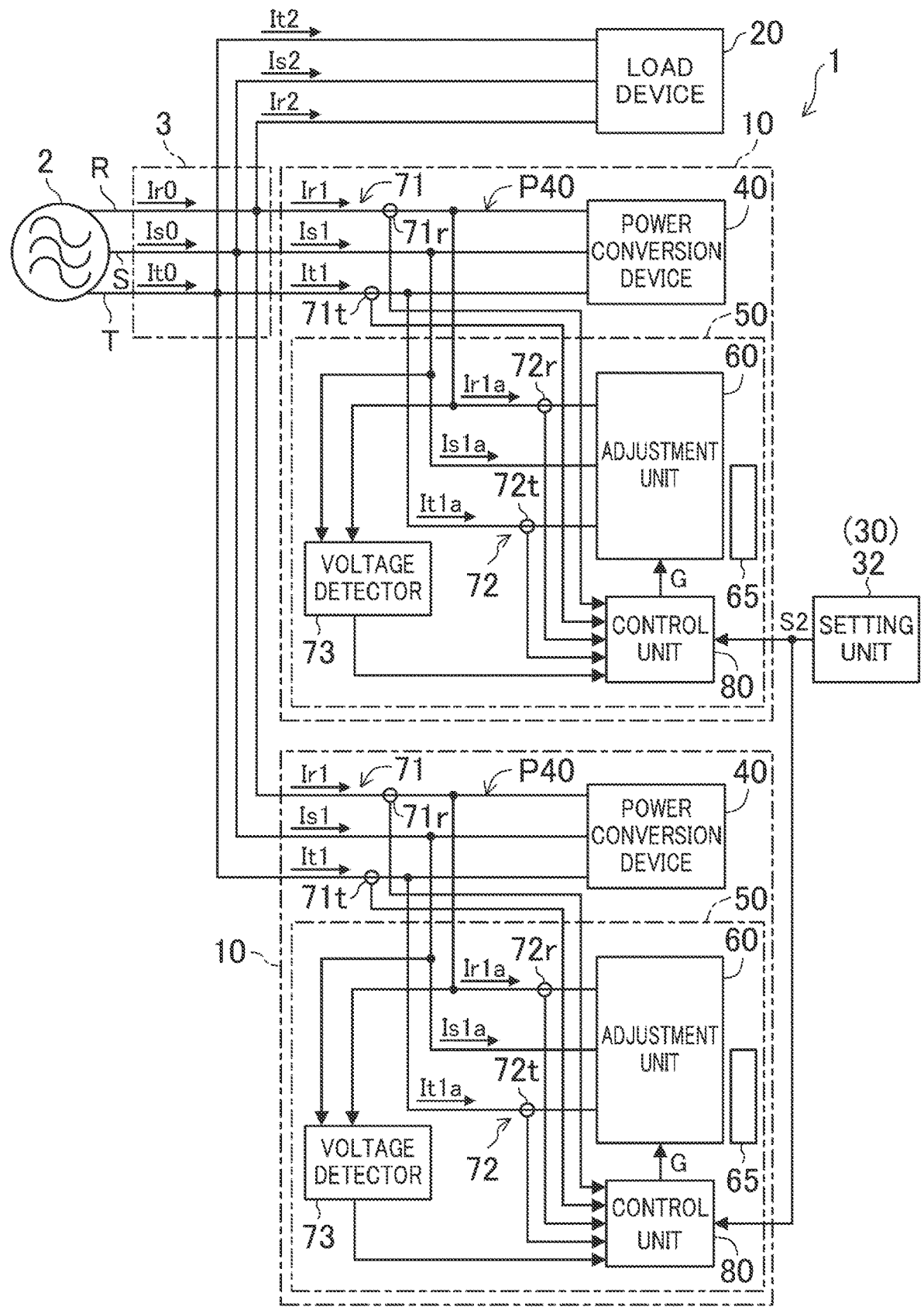
FIG. 6 is a block diagram illustrating a configuration of a system according to a fourth embodiment.

FIG. 6 illustrates a configuration of a system (1) according to a fourth embodiment. This system (1) according to the fourth embodiment includes a distribution board (3), a plurality of (two in this example) air conditioners (10), a load device (20), and a setting unit (32). The configurations of the distribution board (3), the load device (20), and the setting unit (32) according to the fourth embodiment are substantially the same as the configurations of the distribution board (3), the load device (20), and the setting unit (32) according to the third embodiment. The configuration of each of the plurality of air conditioners (10) according to the fourth embodiment is substantially the same as the configuration of the air conditioner (10) according to third embodiment. Note that in the fourth embodiment, the setting unit (32) is shared by the plurality of air conditioners (10). In addition, in the fourth embodiment, the setting unit (32) is provided outside adjustment devices (50). That is, the setting unit (32) is provided outside the air conditioners (10).

Feature (1) of Fourth Embodiment

As described above, the air conditioner (10) according to the fourth embodiment can achieve substantially the same advantages as the air conditioner (10) according to the third embodiment. For example, a current sensor need not be provided on a power source side of the distribution board (3). Thus, the cost (for example, the initial cost) such as the cost for wiring and the cost for manufacturing the current sensor can be reduced compared with the case where such a current sensor is provided.

Feature (2) of Fourth Embodiment

In addition, in the system (1) according to the fourth embodiment, the setting unit (32) is shared by the plurality of air conditioners (10).

In the fourth embodiment, the setting (setting regarding at least one of the type and the presence or absence of the device (20) connected to the AC power source (2) along with the air conditioners (10)) can be collectively made for each of the plurality of air conditioners (10). Thus, the setting can be more easily made for each of the plurality of air conditioners (10) than in the case where one setting unit (32) is provided for each of the plurality of air conditioners (10).

First Modification of Embodiments

In the description above, the case where the adjustment unit (60) is the active filter (61) has been given as an example. However, the adjustment unit (60) is not limited to this.

Figure 7:
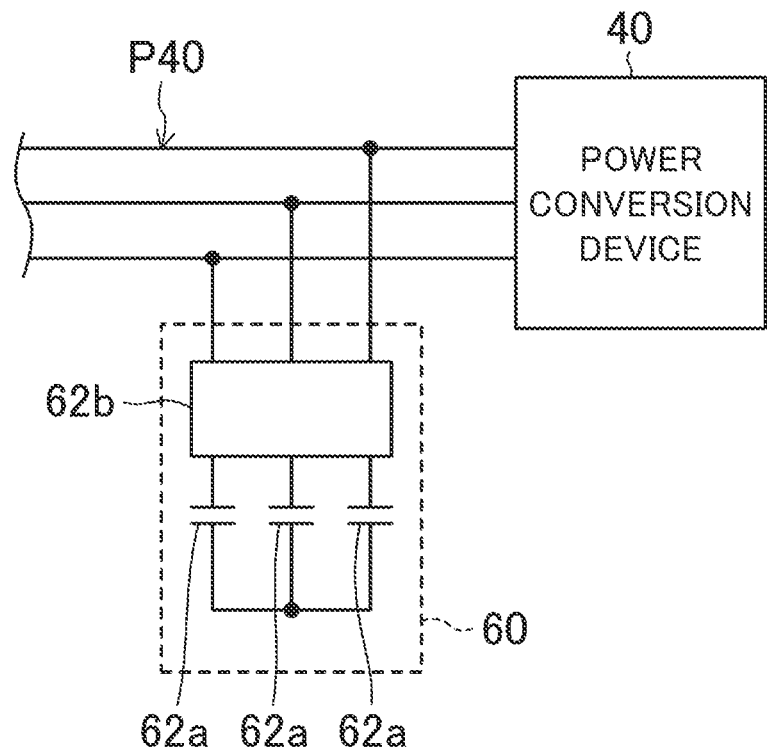
FIG. 7 is a diagram illustrating a configuration of phase advancing capacitors and a switching mechanism.

For example, as illustrated in FIG. 7, the adjustment unit (60) may be phase advancing capacitors (62*a*) and a capacitor switching mechanism (62*b*). The capacitor switching mechanism (62*b*) switches connections between the phase advancing capacitors (62*a*) and the AC power source (2). The capacitor switching mechanism (62*b*) is controlled by the control unit (80). For example, the capacitor switching mechanism (62*b*) is constituted by a thyristor.

Figure 8:
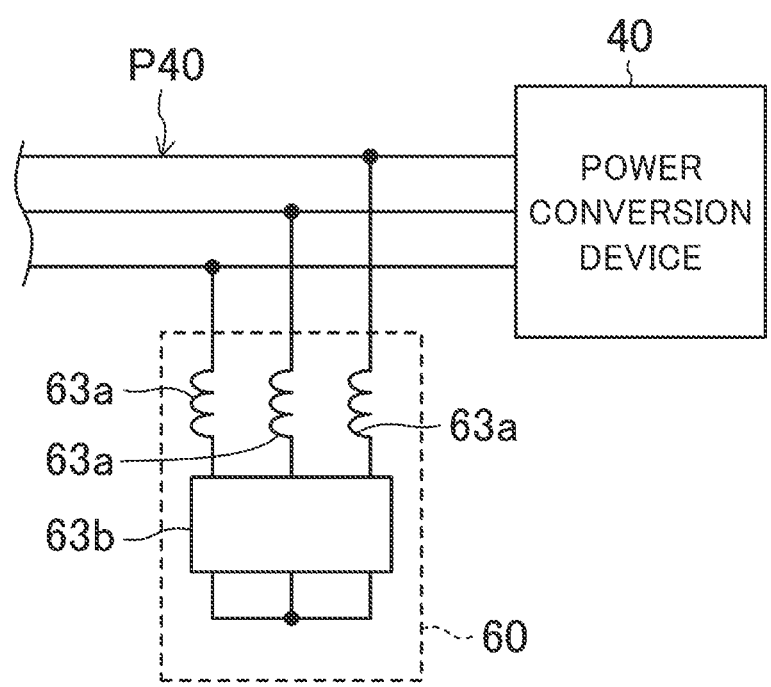
FIG. 8 is a diagram illustrating a configuration of phase delaying reactors and a switching mechanism.

In addition, as illustrated in FIG. 8, the adjustment unit (60) may be phase delaying reactors (63*a*) and a reactor switching mechanism (63*b*). The reactor switching mechanism (63*b*) switches connections between the phase delaying reactors (63*a*) and the AC power source (2). The reactor switching mechanism (63*b*) is controlled by the control unit (80). For example, the reactor switching mechanism (63*b*) is constituted by a thyristor.

In summary, the adjustment unit (60) may include at least one of the active filter (61), the phase advancing capacitors (62*a*) and the capacitor switching mechanism (62*b*) configured to switch connections between the phase advancing capacitors (62*a*) and the AC power source (2), and the phase delaying reactors (63*a*) and the reactor switching mechanism (63*b*) configured to switch connections between the phase delaying reactors (63*a*) and the AC power source (2).

Second Modification of Embodiments

In the description above, the information on the operating state of the load device (20) (the device connected to the AC power source (2) along with the air conditioner (10)) is given as an example of the information according to the target apparent power (the target value of the apparent power to be supplied to the AC power source (2) from the air conditioner (10)). However, the information according to the target apparent power is not limited to this. For example, the information according to the target apparent power may be an apparent power command indicating the target value of the apparent power to be supplied to the AC power source (2) from the air conditioner (10).

As described above, in the air conditioner (10) according to the second modification of the embodiments, the information according to the target value of the apparent power to be supplied to the AC power source (2) from the air conditioner (10) is information on an operating state of a device (20) connected to the AC power source (2) along with the air conditioner (10) or an apparent power command indicating the target value of the apparent power to be supplied to the AC power source (2) from the air conditioner (10).

Third Modification of Embodiments

Note that the control unit (80) may be configured to estimate, based on an operating state of the load device (20), an amount of change in power source power factor (power factor of the AC power source (2)) resulting from an operation of the load device (20), and determine target compensation currents (target values of currents (Ir1a, Is1a, It1a) to be input to the adjustment device (50)) in accordance with the amount of change in power source power factor resulting from the operation of the load device (20) such that the power source power factor becomes equal to the target power factor.

Figure 9:
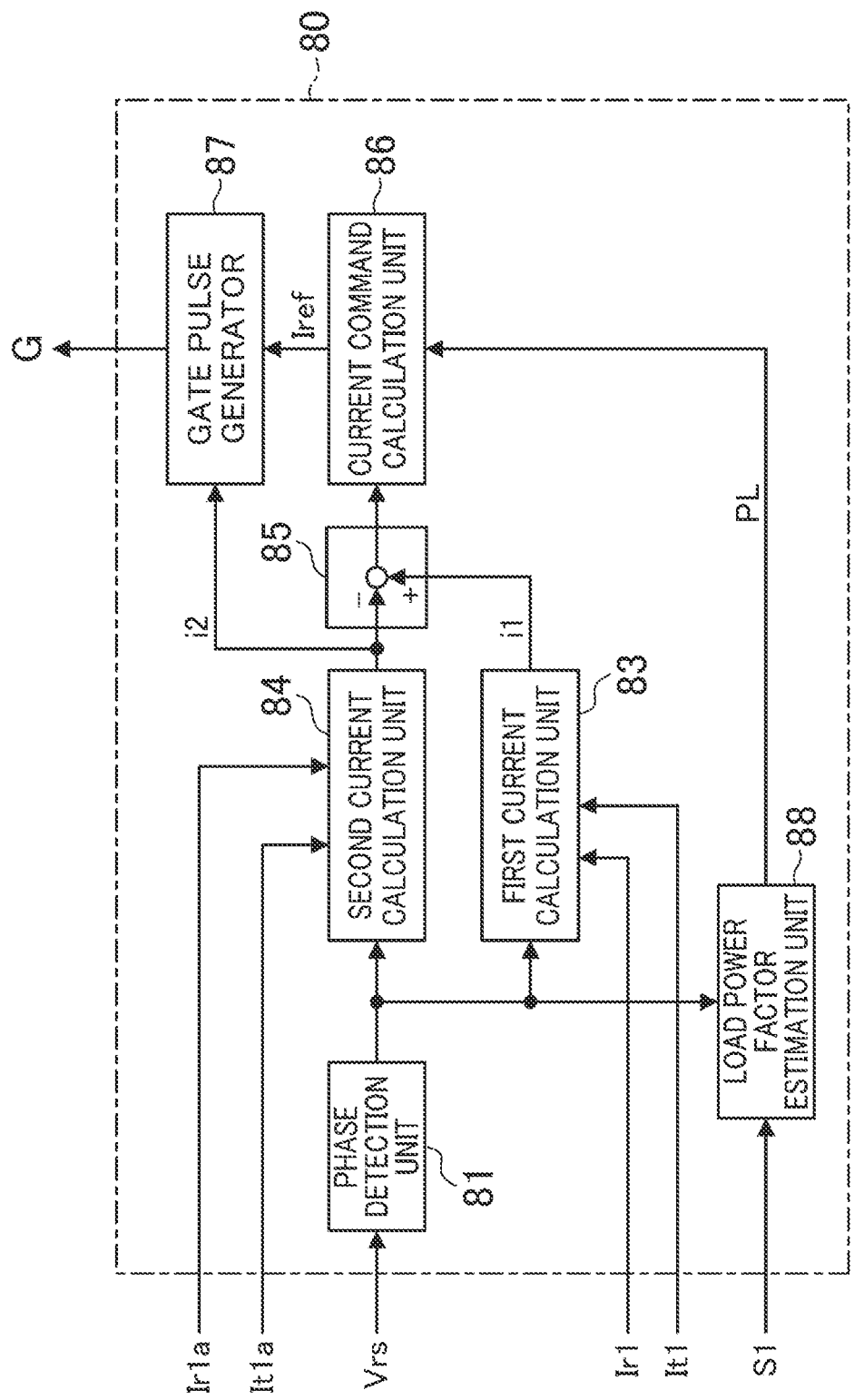
FIG. 9 is a block diagram illustrating a configuration of a modification of the control unit.

For example, as illustrated in FIG. 9, the control unit (80) may include a load power factor estimation unit (88) in place of the load current estimation unit (82) illustrated in FIG. 3. The load power factor estimation unit (88) estimates, based on the detection result obtained by the state detection unit (31), an amount of change in power source power factor resulting from an operation of the load device (20) and outputs the estimate amount of change as a load power factor (PL). Specifically, the load power factor estimation unit (88) has table data in which the operating state of the load device (20) is associated with the amount of change in power source power factor resulting from the operation of the load device (20). The load power factor estimation unit (88) detects, from the table data, the amount of change in power source power factor resulting from the operation of the load device (20) corresponding to the operating state of the load device (20) indicated by the detection signal (S1) output from the state detection unit (31), and outputs the detected amount of change as the load power factor (PL).

Alternatively, in the control unit (80) illustrated in FIG. 9, the load power factor estimation unit (88) may be configured to estimate, based on the setting in the setting unit (32), the amount of change in power source power factor resulting from the operation of the load device (20) and output the estimate amount of change as the load power factor (PL). Specifically, the load power factor estimation unit (88) may have table data in which the setting (at least one of the type and the presence or absence of the load device (20)) in the setting unit (32) is associated with the amount of change in power source power factor resulting from the operation of the load device (20). The load power factor estimation unit (88) may detect, from the table data, the amount of change in power source power factor resulting from the operation of the load device (20) corresponding to the setting in the setting unit (32) indicated by the setting signal (S2) output from the setting unit (32), and output the detected amount of change as the load power factor (PL).

Fourth Modification of Embodiments

In addition, in the description above, a carrier frequency of the active filter (61) driven while the air conditioner (10) is stopped may be lower than a carrier frequency of the active filter (61) driven while the air conditioner (10) is driven.

For example, when the active filter (61) is driven while the air conditioner (10) is driven, the control unit (80) controls the operation of the active filter (61) such that the carrier frequency of the active filter (61) becomes equal to a first frequency that is predetermined. On the other hand, when the active filter (61) is driven while the air conditioner (10) is stopped, the control unit (80) controls the operation of the active filter (61) such that the carrier frequency of the active filter (61) becomes equal to a second frequency that is predetermined. Note that the second frequency is a frequency lower than the first frequency.

As described above, in the air conditioner (10) according to the fourth modification of the embodiments, the carrier frequency of the active filter (61) driven while the air conditioner (10) is stopped is lower than the carrier frequency of the active filter (61) driven while the air conditioner (10) is driven.

In the fourth modification of the embodiments, by setting the carrier frequency of the active filter (61) driven while the air conditioner (10) is stopped to be lower than the carrier frequency of the active filter (61) driven while the air conditioner (10) is driven, an increase in temperature of the active filter (61) driven while the air conditioner (10) is stopped can be reduced. Consequently, a continuous drive time of the active filter (61) can be increased.

Fifth Modification of Embodiments

In addition, in the description above, the active filter (61) may be equipped with a temperature sensor (not illustrated) that detects a temperature of a component that constitutes the active filter (61). A detection result obtained by this temperature sensor is sent to the control unit (80). The control unit (80) then may change the carrier frequency of the active filter (61) in accordance with the temperature of the component that constitutes the active filter (61).

For example, in the case where a temperature-management-target constituent component of the active filter (61) is a component (for example, the reactor (61b)) whose temperature tends to decrease as the carrier frequency of the active filter (61) increases, the control unit (80) increases the carrier frequency of the active filter (61) in response to the temperature of the constituent component exceeding a first temperature that is predetermined and decreases the carrier frequency of the active filter (61) in response to the temperature of the constituent component falling below a second temperature that is predetermined. Note that the second temperature is set to a temperature lower than or equal to the first temperature.

In addition, in the case where the temperature-management-target constituent component of the active filter (61) is a component (for example, the switching element (61c)) whose temperature tends to increase as the carrier frequency of the active filter (61) increases, the control unit (80) decreases the carrier frequency of the active filter (61) in response to the temperature of the constituent component exceeding a first temperature that is predetermined and increases the carrier frequency of the active filter (61) in response to the temperature of the constituent component falling below a second temperature that is predetermined. Note that the second temperature is set to, for example, a temperature lower than or equal to the first temperature.

As described above, in the air conditioner (10) according to the fifth modification of the embodiments, the control unit (80) changes the carrier frequency of the active filter (61) in accordance with the temperature of the component that constitutes the active filter (61).

In the fifth modification of the embodiments, by changing the carrier frequency of the active filter (61) in accordance with the temperature of the component that constitutes the active filter (61), an increase in temperature of the active filter (61) can be reduced. Consequently, a continuous drive time of the active filter (61) can be increased.

Sixth Modification of Embodiments

In addition, in the description above, the active filter (61) may be equipped with temperature sensors (not illustrated) that detect temperatures of the reactor (61b) and the switching element (61c) included in the active filter (61). Detection results obtained by these temperature sensors are sent to the control unit (80). The control unit (80) then may change the carrier frequency of the active filter (61) in accordance with the temperatures of the reactor (61b) and the switching element (61c) included in the active filter (61).

For example, the control unit (80) increases the carrier frequency of the active filter (61) in response to the temperature of the reactor (61b) of the active filter (61) exceeding a first determination temperature that is predetermined and decreases the carrier frequency of the active filter (61) in response to the temperature of the switching element (61c) of the active filter (61) exceeding a second determination temperature that is predetermined. Note that the first determination temperature is set to, for example, the temperature of the switching element (61c) or a temperature obtained by adding a first correction temperature (a temperature higher than zero) that is predetermined to the temperature of the switching element (61c). The second determination temperature is set to, for example, the temperature of the reactor (61b) or a temperature obtained by adding a second correction temperature (a temperature higher than zero) that is predetermined to the temperature of the reactor (61b).

As described above, in the air conditioner (10) according to the sixth modification of the embodiments, the control unit (80) changes the carrier frequency of the active filter (61) in accordance with the temperatures of the reactor (61b) and the switching element (61c) included in the active filter (61).

In the sixth modification of the embodiments, by changing the carrier frequency of the active filter (61) in accordance with the temperatures of the reactor (61b) and the switching element (61c) included in the active filter (61), an increase in temperature of the active filter (61) can be reduced. Consequently, a continuous drive time of the active filter (61) can be increased.

Seventh Modification of Embodiments

In addition, in the description above, the control unit (80) may drive the cooler (65) in the case where the active filter (61) is driven while the air conditioner (10) is stopped.

For example, the control unit (80) drives the cooler (65) in the case where an increase in temperature of the active filter (61) cannot be sufficiently reduced by changing the carrier frequency of the active filter (61) described above while the air conditioner (10) is stopped.

As described above, in the air conditioner (10) according to the seventh modification of the embodiments, the control unit (80) drives the cooler (65) in the case where the active filter (61) is driven while the air conditioner (10) is stopped.

In the seventh modification of the embodiments, since the cooler (65) can be compulsorily driven in the case where the active filter (61) is driven while the air conditioner (10) is stopped, an increase in temperature of the active filter (61) driven while the air conditioner (10) is stopped can be reduced. Consequently, a continuous drive time of the active filter (61) can be increased.

Eighth Modification of Embodiments

In addition, in the description above, the active filter (61) may be constituted by using a wide-bandgap semiconductor. For example, the switching element included in the active filter (61) may be constituted by using any of silicon carbide, gallium oxide, and diamond that are an example of the wide-bandgap semiconductor.

As described above, in the air conditioner (10) according to the eighth modification of the embodiments, the active filter (61) is constituted by using a wide-bandgap semiconductor.

In the eighth modification of the embodiments, by constituting the active filter (61) by using a wide-bandgap semiconductor, a power loss in the active filter (61) can be reduced. Consequently, an increase in temperature of the active filter (61) can be reduced, and a continuous drive time of the active filter (61) can be increased.

Ninth Modification of Embodiments

In addition, in the description above, the control unit (80) may control the adjustment unit (60) such that the adjustment unit (60) is continuously driven in a period of 14 hours or longer including a time period (for example, a time period from 8:00 to 22:00) in which a power-factor-based discount is given.

As described above, in the air conditioner (10) according to the ninth modification of the embodiments, the control unit (80) controls the adjustment unit (60) such that the adjustment unit (60) is continuously driven in a period of 14 hours or longer including a time period in which a power-factor-based discount is given.

In the ninth modification of the embodiments, by controlling the adjustment unit (60) such that the adjustment unit (60) is continuously driven in the period of 14 hours or longer including the time period in which the power-factor-based discount is given, the apparent power to be supplied to the AC power source (2) from the air conditioner (10) can be controlled such that the power factor of the AC power source (2) approaches the target power factor (for example, 1) even in a time period that is not the time period in which the power-factor-based discount is given.

Other Embodiments

Note that a scheme for sending and receiving data (or signals) in the system (1) may be a wired scheme or a wireless scheme. Specifically, data may be sent and received between various sensors (for example, the first current detector (71), the second current detector (72), etc.) and the control unit (80) and signals may be sent and received between the input unit (30) (the state detection unit (31) or the setting unit (32)) and the control unit (80) in accordance with a wired scheme or a wireless scheme. Note that when the scheme for sending and receiving such data (or signals) is a wireless scheme, wiring can be omitted.

In addition, in the description above, the case where the adjustment device (50) is incorporated into the air conditioner (10) has been given as an example. However, the configuration is not limited to this. For example, the adjustment device (50) may be provided outside the air conditioner (10) or may be incorporated into another device (for example, the load device (20)) different from the air conditioner (10). Similarly to this, the adjustment unit (60) and the control unit (80) may be incorporated into the air conditioner (10), may be provided outside the air conditioner (10), or may be incorporated into another device (for example, the load device (20)) different from the air conditioner (10).

In addition, in the first embodiment and the second embodiment, the case where the state detection unit (31) is provided outside the air conditioner (10) has been given as an example. However, the configuration is not limited to this. For example, the state detection unit (31) may be incorporated into the air conditioner (10) or may be incorporated into another device (for example, the load device (20)) different from the air conditioner (10).

In addition, in the third embodiment and the fourth embodiment, the case where the setting unit (32) is incorporated into the air conditioner (10) and the case where the setting unit (32) is provided outside the air conditioner (10) have been given as examples. However, the configuration is not limited to this. For example, the setting unit (32) may be incorporated into another device (for example, the load device (20)) different from the air conditioner (10).

While the embodiments and modifications have been described, it should be understood that various modifications can be made on the configurations and details without departing from the gist and the scope of the claims. In addition, the embodiments and modifications above may be combined or replaced as appropriate unless the functionality of the target of the present disclosure is reduced.

As described above, the present disclosure is useful as an air conditioner.

The invention claimed is:

1. An air conditioner connected to an AC power source, the air conditioner comprising:
   an adjustment unit configured to adjust apparent power at a power source input terminal of the air conditioner; and
   a control unit configured to control the adjustment unit, based on information according to a target value of apparent power to be supplied to the AC power source from the air conditioner, wherein
   the information according to the target value of the apparent power to be supplied to the AC power source from the air conditioner is an apparent power command indicating the target value of the apparent power to be supplied to the AC power source from the air conditioner or information on an operating state, other than current, of a device connected to the AC power source along with the air conditioner.

2. The air conditioner according to claim 1, wherein the adjustment unit includes at least one of
   an active filter connected to the AC power source,
   a phase advancing capacitor and a capacitor switching mechanism configured to switch a connection between the phase advancing capacitor and the AC power source, and
   a phase delaying reactor and a reactor switching mechanism configured to switch a connection between the phase delaying reactor and the AC power source.

3. The air conditioner according to claim 2, wherein
   the information according to the target value of the apparent power to be supplied to the AC power source from the air conditioner is the information on the operating state, other than the current, of the device connected to the AC power source along with the air conditioner,
   the information on the operating state, other than the current, of the device connected to the AC power source along with the air conditioner is input to an input unit, and
   the control unit is configured to control the adjustment unit, based on the information input to the input unit.

4. The air conditioner according to claim 3, wherein
   the input unit includes a state detection unit configured to detect the operating state, other than the current, of the device connected to the AC power source along with the air conditioner, and
   the control unit is configured to control the adjustment unit, based on a detection result obtained by the state detection unit.

5. The air conditioner according to claim 3, wherein
   the input unit includes a setting unit in which at least one of a type and presence or absence of the device connected to the AC power source along with the air conditioner is set, and
   the control unit is configured to control the adjustment unit, based on the setting in the setting unit.

6. The air conditioner according to claim 2, wherein
   even while the air conditioner is stopped, the control unit is configured to control the adjustment unit, based on the information according to the target value of the apparent power to be supplied to the AC power source from the air conditioner.

7. The air conditioner according to claim 1, wherein
   the information according to the target value of the apparent power to be supplied to the AC power source from the air conditioner is the information on the operating state, other than the current, of the device connected to the AC power source along with the air conditioner,
   the information on the operating state, other than the current, of the device connected to the AC power source along with the air conditioner is input to an input unit, and
   the control unit is configured to control the adjustment unit, based on the information input to the input unit.

8. The air conditioner according to claim 7, wherein
   the input unit includes a state detection unit configured to detect the operating state, other than the current, of the device connected to the AC power source along with the air conditioner, and
   the control unit is configured to control the adjustment unit, based on a detection result obtained by the state detection unit.

9. The air conditioner according to claim 7, wherein
   the input unit includes a setting unit in which at least one of a type and presence or absence of the device connected to the AC power source along with the air conditioner is set, and
   the control unit is configured to control the adjustment unit, based on the setting in the setting unit.

10. The air conditioner according to claim 7, wherein
    even while the air conditioner is stopped, the control unit is configured to control the adjustment unit, based on the information according to the target value of the apparent power to be supplied to the AC power source from the air conditioner.

11. The air conditioner according to claim 1, wherein
    even while the air conditioner is stopped, the control unit is configured to control the adjustment unit, based on the information according to the target value of the apparent power to be supplied to the AC power source from the air conditioner.

12. The air conditioner according to claim 11, wherein
    the adjustment unit includes an active filter connected to the AC power source, and
    a carrier frequency of the active filter driven while the air conditioner is stopped is lower than a carrier frequency of the active filter driven while the air conditioner is driven.

13. The air conditioner according to claim 11, further comprising:
    a cooler, the adjustment unit including an active filter connected to the AC power source, the cooler being arranged and configured to cool the active filter, and the control unit being configured to drive the cooler in a case in which the active filter is driven while the air conditioner is stopped.

14. The air conditioner according to claim 1, wherein the adjustment unit includes an active filter connected to the AC power source, and the control unit is configured to change a carrier frequency of the active filter in accordance with a temperature of at least one component that forms at least part of the active filter.

15. The air conditioner according to claim 14, wherein the active filter includes a reactor and a switching element, and the control unit is configured to change the carrier frequency of the active filter in accordance with temperatures of the reactor and the switching element included in the active filter.

16. The air conditioner according to claim 1, wherein the adjustment unit includes an active filter connected to the AC power source, and the active filter is formed by using a wide-bandgap semiconductor.

17. The air conditioner according to claim 1, wherein the control unit is configured to control the adjustment unit such that the adjustment unit is continuously driven in a period of at least 14 hours including a time period in which a power-factor-based discount is given.

* * * * *